US009920673B2

(12) United States Patent
Becht et al.

(10) Patent No.: US 9,920,673 B2
(45) Date of Patent: Mar. 20, 2018

(54) TEMPERED SCR-LINE AND TEMPERED SCR-LINE BUNDLES

(71) Applicant: VOSS Automotive GmbH, Wipperfürth (DE)

(72) Inventors: Andreas Becht, Freisbach (DE); Alexander Bohl, Wuppertal (DE); Klaus Kaltwasser, Köln (DE); Sascha Rosenfeldt, Wipperfürth (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 516 days.

(21) Appl. No.: 14/567,240

(22) Filed: Dec. 11, 2014

(65) Prior Publication Data
US 2016/0069236 A1 Mar. 10, 2016

(30) Foreign Application Priority Data

Sep. 4, 2014 (DE) .......................... 10 2014 112 731

(51) Int. Cl.
*F01N 3/00* (2006.01)
*F01N 3/20* (2006.01)
(Continued)

(52) U.S. Cl.
CPC ............. *F01N 3/206* (2013.01); *F01N 3/208* (2013.01); *F01N 3/2066* (2013.01);
(Continued)

(58) Field of Classification Search
CPC ............... F01N 13/141; F01N 2470/12; F01N 2530/18; F01N 2610/02; F01N 2610/10;
(Continued)

(56) References Cited

U.S. PATENT DOCUMENTS 3,958,297 A * 5/1976 Hukuba ................ A47L 9/0063
15/315
6,517,118 B2 * 2/2003 Kato ....................... F16L 11/06
285/222.1
(Continued)

FOREIGN PATENT DOCUMENTS

DE    102010055520 A1    6/2012
EP        1 770 251 A2    4/2007

*Primary Examiner* — Thai Ba Trieu
*Assistant Examiner* — Diem Tran
(74) *Attorney, Agent, or Firm* — Eric J. Sosenko; Jonathan P. O'Brien; Honigman Miller Schwartz and Cohn LLP

(57) ABSTRACT

The invention relates to an SCR line for treatment of exhaust from an internal combustion engine and including a first hose to carry a reducing agent, a second hose to carry a tempering agent and a pipe enclosing the two hoses. The two hoses are arranged in the pipe so as to run side by side in parallel. Each of the same-side ends of the first hose and of the pipe are connected to a reducing agent coupling housing. The ends of the second hose are each connected to a tempering agent coupling part separate from the reducing agent coupling housing. At least one of the reducing agent coupling housings has a through-opening at the outer perimeter. The second hose runs from the interior of the pipe through the through-opening to the outside. Furthermore, the invention relates to an SCR line bundle with an SCR line.

18 Claims, 4 Drawing Sheets

Figure 1A:
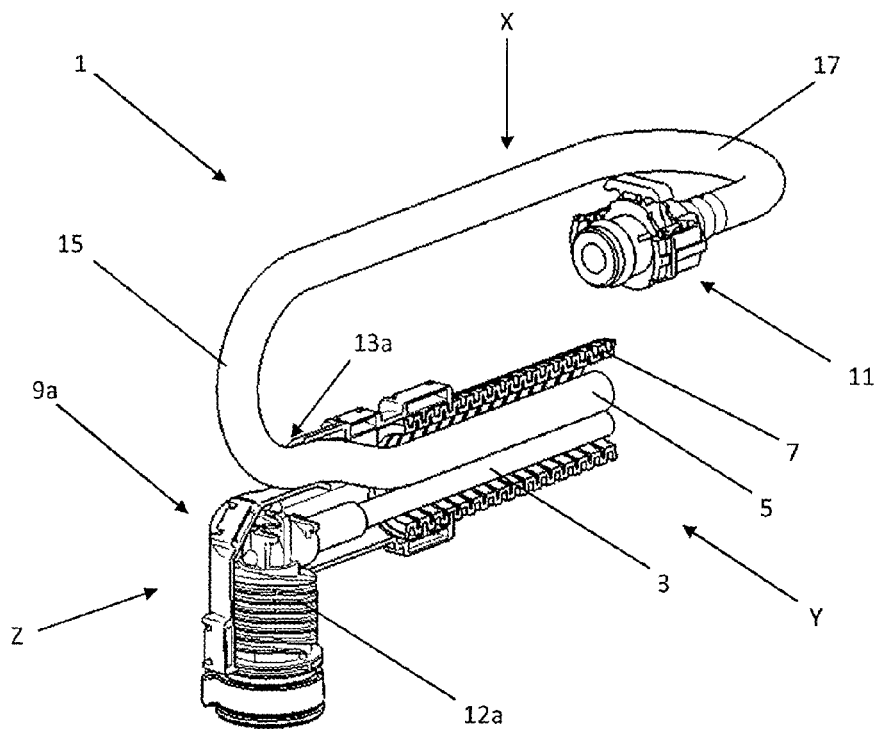

(51) Int. Cl.
*F01N 3/28* (2006.01)
*F01N 13/14* (2010.01)

(52) U.S. Cl.
CPC ......... *F01N 3/2896* (2013.01); *F01N 13/141* (2013.01); *F01N 2470/12* (2013.01); *F01N 2530/18* (2013.01); *F01N 2610/02* (2013.01); *F01N 2610/10* (2013.01); *F01N 2610/14* (2013.01); *F01N 2610/1473* (2013.01); *Y02T 10/24* (2013.01)

(58) Field of Classification Search
CPC ......... F01N 2610/14; F01N 2610/1473; F01N 3/206; F01N 3/2066; F01N 3/208; F01N 3/2896; Y02T 10/24
See application file for complete search history.

(56) References Cited

U.S. PATENT DOCUMENTS

| 8,209,957 | B2 | 7/2012 | Behrendt et al. |
| 9,353,662 | B2 * | 5/2016 | Schwarzkopf ........ F01N 3/2066 |

* cited by examiner

TEMPERED SCR-LINE AND TEMPERED SCR-LINE BUNDLES

The invention relates to a Selective Catalytic Reduction (SCR) line for treatment of exhaust from an internal combustion engine, comprising a first hose to carry a reducing agent, a second hose to carry a tempering agent and a pipe encompassing the two hoses, wherein the two hoses are arranged so as to run side by side in parallel. In addition, the invention relates to an SCR line bundle comprising an SCR intake line, an SCR return line and an SCR pressure line for an SCR system of an internal combustion engine with a tank for reducing agent, a reducing agent pump unit and a reducing agent dosing unit.

To prevent nitrogen oxide emissions from an internal combustion engine it is basically known from the prior art to convert the nitrogen oxides produced by the combustion into atmospheric nitrogen and water vapor with the aid of selective catalytic reduction (SCR). As a rule, an aqueous solution of urea is used as reducing agent, which is stored in a reducing agent tank. The reducing agent is supplied by means of a reducing agent pump unit to a reducing agent dosing unit. The reducing agent dosing unit sends the reducing agent in a controlled manner into the exhaust stream of the internal combustion engine upstream of the catalyzer. Since the exhaust stream is particularly hot, high temperatures are produced in the reducing agent dosing unit, which necessitates cooling of the reducing agent dosing unit during operation of the internal combustion engine. Thus for example the reducing agent dosing unit is cooled by means of the coolant water circuit of the internal combustion engine. Alternatively, the reducing agent dosing unit can be cooled by the reducing agent itself, wherein in this case more reducing agent than for the chemical SCR process is needed, and is supplied to the reducing agent dosing unit. Surplus reducing agent is pumped from the reducing agent dosing unit by the reducing agent pump unit back to the reducing agent tank.

The reducing agent dosing unit, the reducing agent tank and the reducing agent pump unit are connected with each other by hoses and suitable couplings. The internal combustion engines are also operated at low temperatures of <−11° C., at which the reducing agent can freeze up in the various units and in the hoses, in particular when aqueous urea solution is used as the reducing agent. This can damage the SCR system. To prevent freeze-up, the individual units and the hoses may have to be heated, especially depending on the outside temperatures and the operating phase.

In this respect, electrically heated units and hoses are known in particular. But these have the disadvantage that the provided electric power is not sufficient under certain circumstances to supply sufficient heating power.

In document EP 1 770 251 A1 and in EP 2 010 768 A1 known SCR line bundles are described in which one reducing agent hose is provided for the inlet and one reducing agent hose for the return, wherein a hose carrying hot water is paired in the immediate vicinity of each hose carrying reducing agent so as to release heat, wherein the hose pairs are arranged in axially extending recesses, open to the outer perimeter, said recesses being in an extruded profile consisting of a heat-conducting, elastomer material. The heating water here branches off from the coolant water circuit of the internal combustion engine. The hoses feature suitable plug-in connectors so that they can be connected to the various units of the SCR system and to the coolant water circuit. The plug-in connectors include connection blocks, which are flushed by the hot water and are intended to prevent freeze-up of the plug-in connectors.

Such SCR line bundles have the disadvantage that they can be damaged by environmental factors. In addition, the flushed plug-in connectors are susceptible to leaking. Further, assembly of such SCR lines and SCR line bundles is inflexible and expensive and requires a relatively large installation space.

The problem to be solved by the invention is therefore that of designing an SCR line and an SCR line bundle for treatment of exhaust from an internal combustion engine in which sufficient tempering of the SCR system is ensured, wherein they can be easily and flexibly installed in various assembly situations and applications and in addition may be manufactured at a reasonable cost.

This problem is solved according to the invention by an SCR line with the features of the characterizing part of claim 1 and by an SCR line bundle with the features of the characterizing part of claim 13.

In this respect, in the case of the SCR line or at least the SCR return line and the SCR pressure line of the SCR line bundle, each of the same-side ends of the first hose and of the pipe are connected to a reducing agent coupling housing, and the ends of the second hose are each connected to a tempering agent coupling part separate from the reducing agent coupling housing, wherein at least one of the reducing agent coupling housings has a through-opening at the outer perimeter, wherein the second hose runs from the interior of the pipe through the through-opening to the outside. The simple design with the two hoses guided in one pipe allows simple manufacture of the hose and an adequate protection of the hoses, as well as effective heat transfer from the second hose to the first hose. Because the couplings of the two hoses are separated, simple and flexible assembly of the SCR lines and SCR line bundle is possible, so that they can be easily installed even in particularly small assembly spaces.

In one preferred embodiment of the invention, the second hose is designed so as to rotate about its own axis in at least one through-opening of the reducing agent coupling housing. This increases flexibility and simplifies installation, since the profile of the second hose and the position of the coupling parts of the second hose can be easily varied.

In a further embodiment of the invention, the part of the second hose extending from the through-opening has at least one first flexure point. In particular, the second hose features a second flexure point adjoining the first flexure point. The flexure points allow an optimized course of the second hose along other components, so that assembly is simplified and the install space for the SCR line can be optimally used.

In addition, in yet another embodiment of the invention, in an SCR line bundle, a tempering agent coupling part of the second hose of the SCR pressure line is connected directly to a tempering agent coupling part of the second hose of the SCR return line. This allows a flexible use of the SCR lines according to the invention with reducing agent dosing units which are not tempered by the coolant water circuit, but rather are tempered by the reducing agent itself. Due to the direct connection of the second hoses of the particular SCR line to each other, the coolant water circuit is further connected in a simple and flexible manner and thus the reducing agent dosing unit is short-circuited with respect to the cooling water circuit.

Additional advantageous embodiments of the invention arise in the following description of figures and from the dependent claims.

Figures 1B, 1C:
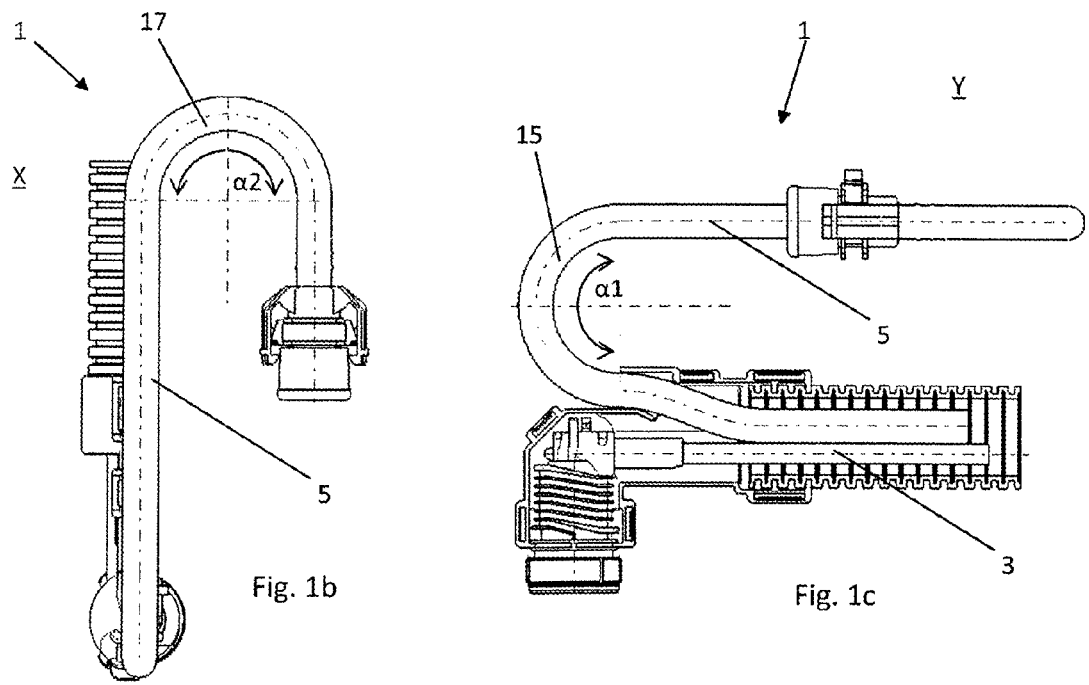
Figure 1D:
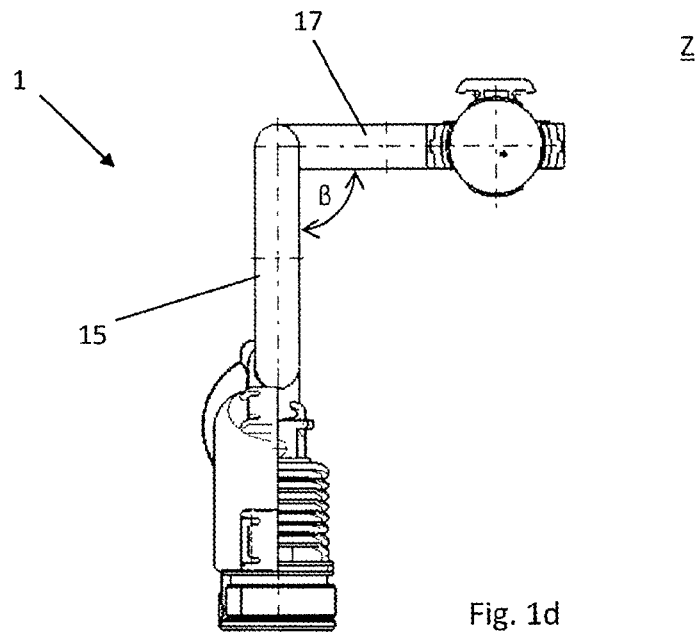
Figure 2:
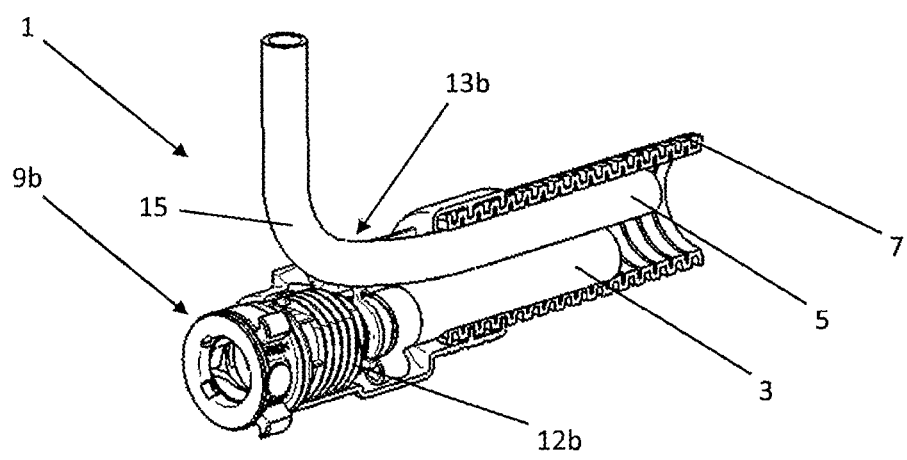
Figure 3:
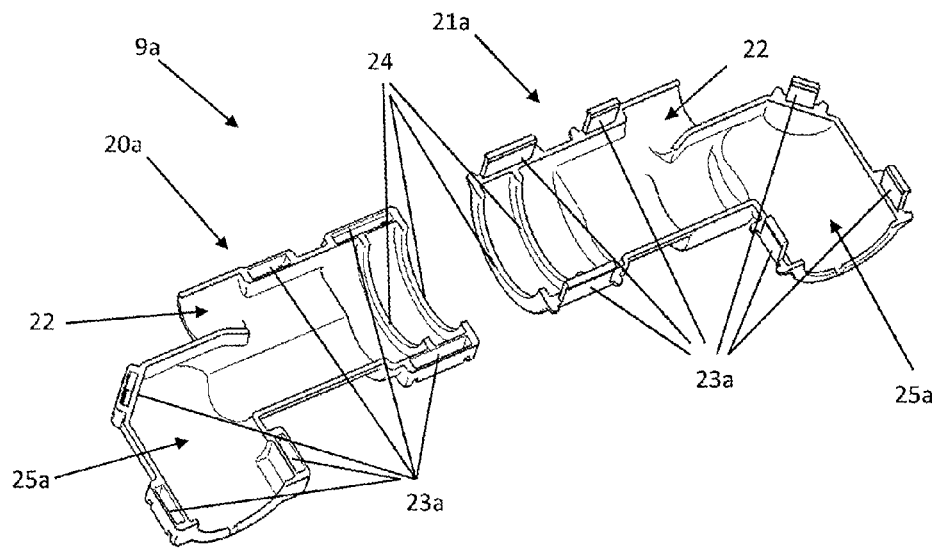
Figure 4:
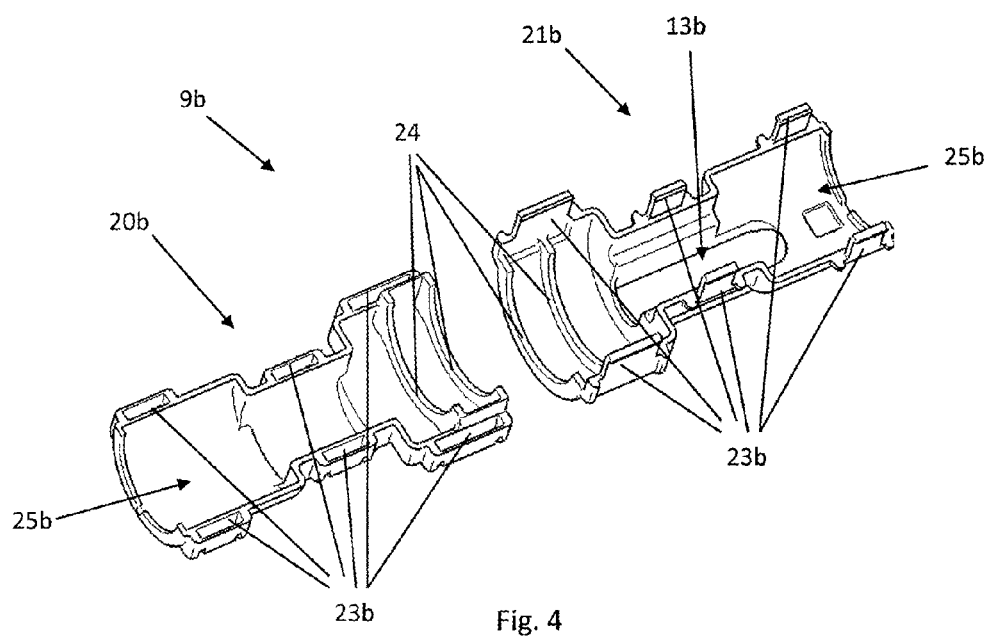
Figure 5:
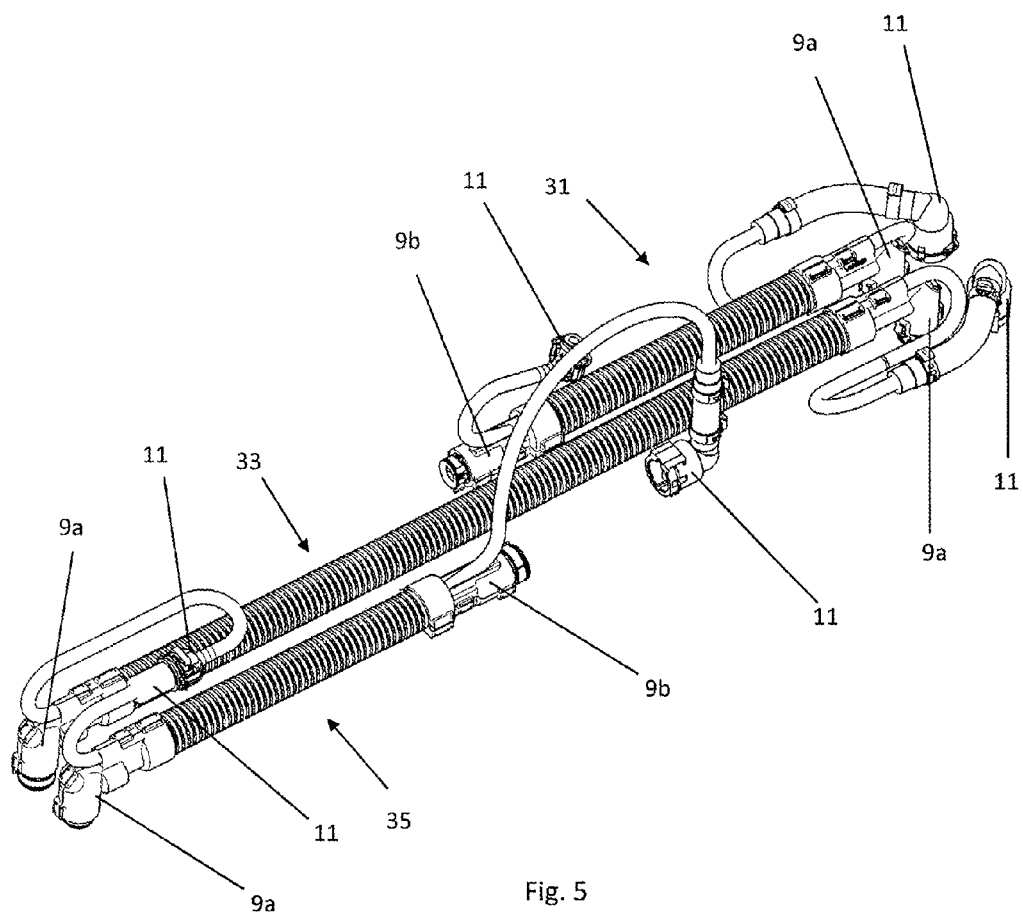

The figures show:

FIG. 1a A three-dimensional view of a partial cross section through a first embodiment of one end of the SCR line according to the invention, FIG. 1b A two-dimensional view of FIG. 1a in direction X, FIG. 1c A two-dimensional view of FIG. 1a in direction Y, FIG. 1d A two-dimensional view of FIG. 1a in direction Z, FIG. 2 A partial cross section through a second embodiment of one end of the SCR line according to the invention without a coupling part for the second hose, FIG. 3 A three-dimensional view of two housing halves of the coupling housing of the embodiment of the SCR line according to FIG. 1, FIG. 4 A three-dimensional view of two housing halves of the coupling housing of the embodiment of the SCR line according to FIG. 2, and FIG. 5 A three-dimensional view of an SCR line according to the invention.

The same components are always designated by the same reference signs in the various figures of the illustrative material.

With respect to the following description, it is expressly stated that the invention is not restricted to the exemplary embodiments or to any or to all features of the described combination of features; rather, each individual partial feature of each exemplary embodiment is inventive individually and separately from all other partial features described in connection therewith, and also is relevant to the subject matter of the invention in combination with any and all features of any other exemplary embodiment.

FIG. 1a and FIG. 2 each present a partial cross section of one embodiment of one end of an SCR line 1 according to the invention for treatment of exhaust from an internal combustion engine. The SCR line 1 comprises a first hose 3 to supply a reducing agent, a second hose 5 to supply a tempering agent, and a pipe 7 enclosing the two hoses 3, 5, wherein the two hoses 3, 5 are arranged side by side in parallel to each other in the pipe 7. The pipe 7 is designed in particular as a corrugated pipe. At least one of the hoses 3, 5, preferably the second hose 5, is designed preferably so as to be shape-stable. In particular the shape-stable hoses 3, 5 are produced from polyamide, such as for example the material PA12.

The same-side ends of the first hose 3 and of the pipe 7 are connected to a reducing agent coupling housing 9a, 9b. The ends of the second hose 5 are each connected to a tempering agent coupling part 11 that is separate from the reducing agent coupling housing 9a, 9b. In FIG. 1 only one end of the hoses 3, 5 and only one reducing agent coupling housing 9a, as well as only one tempering agent coupling part 11 are illustrated. In FIG. 2 an inventive variant of the reducing agent coupling housing 9b is illustrated, and the tempering agent coupling part 11 is not. The reducing agent coupling housing 9a, 9b and the tempering agent coupling part 11 are produced in particular from polyamide, in particular from PA6 or PA66. The reducing agent coupling housing 9a, 9b has electrical heating elements 12a, 12b, especially in the interior, for heating the housing. The reducing agent coupling housing 9a, 9b has a through-opening 13a, 13b on the outer perimeter. The second hose 5 runs from the interior of the pipe 7 through the through-opening 13a, 13b to the outside. The second hose 5 here can rotate about its own axis, especially in the through-opening 13a, 13b of the reducing agent coupling housing 9a, 9b. This allows twisting of the second hose 5 during the installation and thus a particularly flexible alignment of the second hose 5 and installation of the tempering agent coupling part 11 outside of the pipe 7.

In the preferred embodiment illustrated in FIGS. 1a, 1b, 1c and 1d, the part of the second hose 5 extending from the through-opening 13a, 13b has a first flexure point 15. The flexure angle $\alpha 1$ of the first flexure point 15 between a part of the second hose 5 running parallel to the first hose 3, and a part after the flexure point 15 amounts to at least 90°. In particular, the second hose 5 features a second flexure point 17 adjoining to the first flexure point 15. The flexure angle $\alpha 2$ of the second flexure point 17 between a part located in front of the flexure point 17 and a part located after the flexure point 15 is at least 90°. Preferably the two flexure points 15, 17 are designed such that a first plane drawn through the first flexure point 15 and a second plane drawn through the second flexure point 17 subtend an angle $\beta$ greater than 0° and less than 180°. In the embodiment represented in FIG. 1, the two flexure points 15, 17 are designed such that the first plane and the second plane subtend an angle $\beta$ of 90°. Alternatively, in yet another embodiment it would be possible to design the two flexure points 15, 17 such that the first plane and the second plane subtend an angle $\beta$ of 45°. The flexure points 15, 17 are produced in particular by heating of the second hose 5 and thermoplastic deformation thereof.

FIGS. 3 and 4 show a three-dimensional view of two housing shells of the reducing agent coupling housing 9a, 9b of the embodiment of the SCR line according to FIG. 1 and/or according to FIG. 2, respectively. Preferably the reducing agent coupling housing 9a, 9b comprises two housing shells 20a, 20b, 21a, 21b. When assembled, the two housing shells 20a, 20b, 21a, 21b are connected to each other preferably by means of snap-on elements 23a, 23b.

In the embodiment according to FIG. 3, the two housing shells 20a, 21a are symmetrically designed, wherein the through-opening 13a is formed by means of channels 22 formed in the housing shells 20a, 21a.

In the embodiment according to FIG. 4, the two housing shells 20b, 21b are dissimilar, wherein the one housing shell 21b has all of the through-opening 13b for the second hose 5.

At one end of the reducing agent coupling housing 9a, 9b, each of the housing shells 20a, 20b, 21a, 21b form a receiving opening with perimeter attachment lugs 24 on the inner perimeter for connection with the pipe 7 and a receiving space 25a, 25b for a reducing agent coupling part (not shown) which is installed in the reducing agent coupling housing 9a, 9b and is fluidly connected to the first hose 3.

FIG. 5 shows a three-dimensional view of an SCR line bundle according to the invention, which is comprised of an SCR intake line 31, an SCR return line 33 and an SCR pressure line 35 for an SCR system of an internal combustion engine with a reducing agent tank (not shown), a reducing agent pump unit and a reducing agent dosing unit. At least the SCR return line 33 and the SCR pressure line 35 are designed as an SCR line 1 per the invention as described above. In the illustrated, preferred embodiment, the SCR intake line 31 is also designed as an SCR line 1 according to the invention as described above.

In an SCR system, it is provided in particular that the tempering agent tempers the reducing agent pump unit and the reducing agent tank.

The individual SCR lines 31, 33, 35 of the SCR line bundle are arranged and are connected to each other such that the SCR pressure line 35 is fluidly connected by its one reducing agent coupling housing 9b of the first hose 3 to a first reducing agent connection of the SCR pump unit, by its other reducing agent coupling housing 9a of the first hose 3 to a first reducing agent connection of the SCR dosing unit, by its one tempering agent coupling part 11 of the second hose line 5 to a first tempering agent connection of the SCR pump unit, and by its other tempering agent coupling part 11 of the second hose 5 to a tempering agent coupling part 11 of the second hose 5 of the SCR return line 33.

In addition, the SCR return line 33 is fluidly connectable by its other tempering agent coupling part 11 of the second hose 5 to a first tempering agent connection of the reducing agent tank, and by its one reducing agent coupling housing 9a of the first hose 3 to a second reducing agent connection of the reducing agent dosing unit, and by its other reducing agent coupling housing 9a of the first hose 3 to a first reducing agent connection of the reducing agent tank.

In addition, the SCR intake line 31 is fluidly connectable by its one reducing agent coupling housing 9a of the first hose 3 to a second reducing agent connection of the reducing agent tank by its other reducing agent coupling housing 9b of the first hose 3 to a second reducing agent connection of the reducing agent pump unit, by its one tempering agent coupling part 11 of the second hose 5 to a tempering agent connection of the reducing agent tank, and by its other tempering agent coupling part 11 of the second hose 5 to a tempering agent connection of the coolant water circuit of the internal combustion engine.

For the return flow of the tempering agent into the cooling water circuit of the internal combustion engine, in particular the reducing agent pump unit is likewise fluidly connectable to a tempering agent connection of the coolant water circuit of the internal combustion engine.

In order that the SCR line bundle can be used in particular for a reducing agent dosing unit cooled exclusively by means of the reducing agent, the one tempering agent cooling part 11 of the second hose 5 of the SCR pressure line 35 is connected directly to a tempering agent coupling part 11 of the second hose 5 of the SCR return line 33.

The invention is not restricted to the illustrated and described exemplary embodiments, but rather also includes all equivalent designs within the meaning of the invention. It is expressly emphasized that the exemplary embodiments are not restricted to all features in combination, rather each individual partial feature can also have inventive significance even when detached from all other partial features. Furthermore, the invention is also not restricted to the combination of features defined in claim 1, but rather also can be defined by any particular other combination of particular features of all the individual features disclosed herein. This means that basically virtually each individual feature of claim 1 can be left out or can be replaced by at least one other single feature disclosed elsewhere in the application.

The invention claimed is:

1. A selective catalytic reduction (SCR) line for treatment of exhaust from an internal combustion engine, comprising a first hose to carry a reducing agent, a second hose to carry a tempering agent and a pipe enclosing the first and second hoses wherein the first and second hoses are arranged in the pipe so as to run side by side in parallel, ends of the first hose and of the pipe on a same side end of the SCR line are connected to reducing agent coupling housings, and ends of the second hose are connected to tempering agent coupling parts that are separate from the reducing agent coupling housings, wherein at least one of the reducing agent coupling housings has a through-opening at an outer perimeter, wherein the second hose runs from an interior of the pipe through the through-opening to an exterior of the at least one of the reducing agent coupling housings.

2. The SCR line according to claim 1, wherein the second hose is configured to rotate about its own axis in the through-opening of the reducing agent coupling housing.

3. The SCR line according to claim 1, wherein a part of the second hose extending from the through-opening includes at least one first flexure point.

4. The SCR line according to claim 3, wherein the first flexure point defines a first flexure angle ($\alpha 1$) between a portion of the second hose running parallel to the first hose and a part after the first flexure point, the first flexure angle ($\alpha 1$) being and angle of at least 90°.

5. The SCR line according to claim 3, wherein the second hose defines a second flexure point adjoining to the first flexure point.

6. The SCR line according to claim 5, wherein the second flexure point defines a second flexure angle ($\alpha 2$), the second flexure angle ($\alpha 2$) being an angle of at least 90°.

7. The SCR line according to claim 5, wherein the first and second flexure points are designed such that a first plane drawn through the first flexure point and a second plane drawn through the second flexure point subtend an angle ($\beta$) greater than 0° and less than 180°.

8. The SCR line according to claim 7, wherein the first and second flexure points are arranged such that the first plane and the second plane subtend an angle ($\beta$) of 45°.

9. The SCR line according to claim 7, wherein the first and second flexure points are arranged such that the first plane and the second plane subtend an angle of 90°.

10. The SCR line according to claim 1, further comprising at least one tempering agent coupling part of the second hose adjoins a flexure point.

11. The SCR line according to claim 1, wherein the second hose is shape-stable.

12. The SCR line according to claim 1, wherein the second hose is produced from a polyamide.

13. The SCR line according to claim 1, wherein the coupling housings are produced from a polyamide.

14. The SCR line according to claim 1, wherein the pipe is a corrugated pipe.

15. A selective catalytic reduction (SCR) line bundle for an SCR system of an internal combustion engine with a tank for a reducing agent, a reducing agent pump unit and a reducing agent dosing unit, the SCR line bundle comprising an SCR intake line, an SCR return line and an SCR pressure line, at least the SCR return line and the SCR pressure line being configured as an SCR line in accordance with claim 1.

16. The SCR line bundle according to claim 15, wherein a tempering agent coupling part of the second hose of the SCR pressure line is connected directly to a tempering agent coupling part of the second hose of the SCR return line.

17. The SCR line according to claim 1, wherein the second hose is produced from the material polyamide PA12.

18. The SCR line according to claim 1, wherein the coupling housings are produced from the material polyamide PA6 or polyamide PA66.

* * * * *